United States Patent [19]

Barenyi et al.

[11] 4,153,290
[45] May 8, 1979

[54] LATERAL COVERING FOR A PASSENGER MOTOR VEHICLE

[75] Inventors: Bela Barenyi, Maichingen; Heinrich Haselmann, Sindelfingen; Egon Rieth, Böblingen, all of Fed. Rep. of Germany

[73] Assignee: Daimler-Benz Aktiengesellschaft, Fed. Rep. of Germany

[21] Appl. No.: 794,705

[22] Filed: May 9, 1977

Related U.S. Application Data

[63] Continuation of Ser. No. 560,819, Mar. 21, 1975.

[30] Foreign Application Priority Data

Mar. 23, 1974 [DE] Fed. Rep. of Germany ....... 2414157

[51] Int. Cl.$^2$ .............................................. B62D 27/00
[52] U.S. Cl. .................................. 296/191; 296/31 P
[58] Field of Search ............. 296/1 R, 21, 31 R, 31 P, 296/28 R, 136; 293/1, 62, 63, DIG. 4; 280/153 R, 153 A, 153.5, 762, 768, 770, 28 A

[56] References Cited

U.S. PATENT DOCUMENTS

| | | | |
|---|---|---|---|
| 3,163,434 | 12/1964 | Kreuger | 296/31 P X |
| 3,794,373 | 2/1974 | Manning | 296/28 A |

FOREIGN PATENT DOCUMENTS

| | | | |
|---|---|---|---|
| 2021927 | 5/1970 | Fed. Rep. of Germany | 280/153 R |
| 986608 | 10/1951 | France | 296/28 A |
| 1210574 | 10/1970 | United Kingdom | 296/21 |

*Primary Examiner*—Philip Goodman
*Attorney, Agent, or Firm*—Craig & Antonelli

[57] ABSTRACT

A lateral body panel covering for a passenger motor vehicle which covers the framework within the area between the front and/or rear vehicle ends and a lateral door opening; the area between a wheel casing and the door opening is thereby covered off by an independently detachable covering member which preferably consists of a non-metallic material.

33 Claims, 13 Drawing Figures

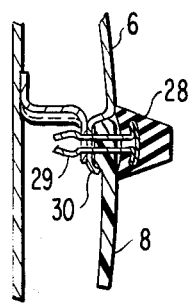
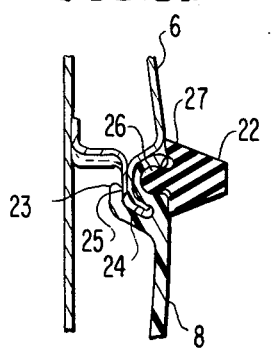
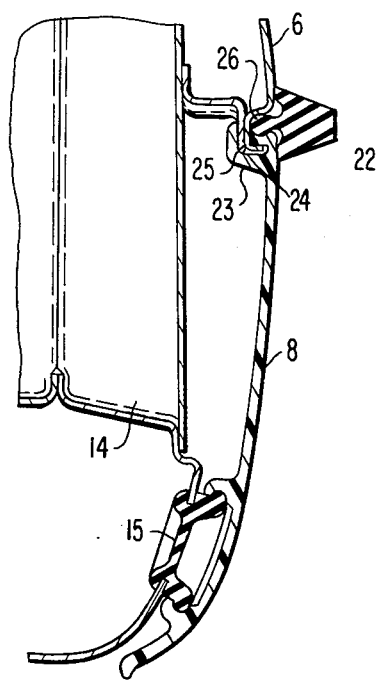
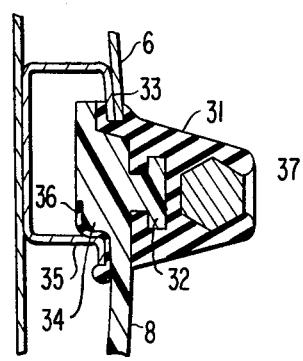
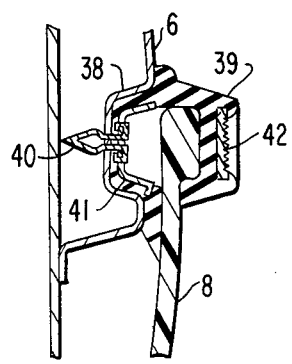
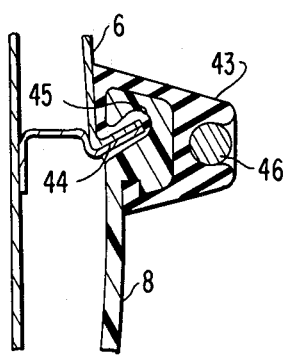

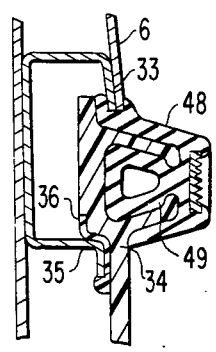
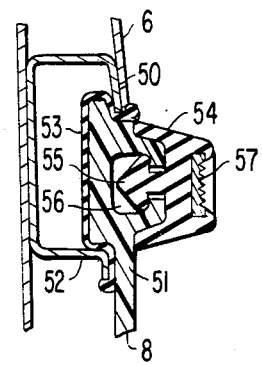
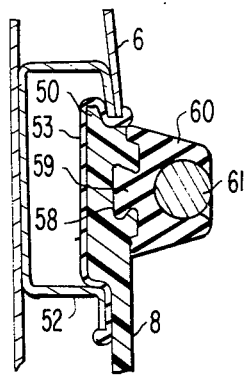
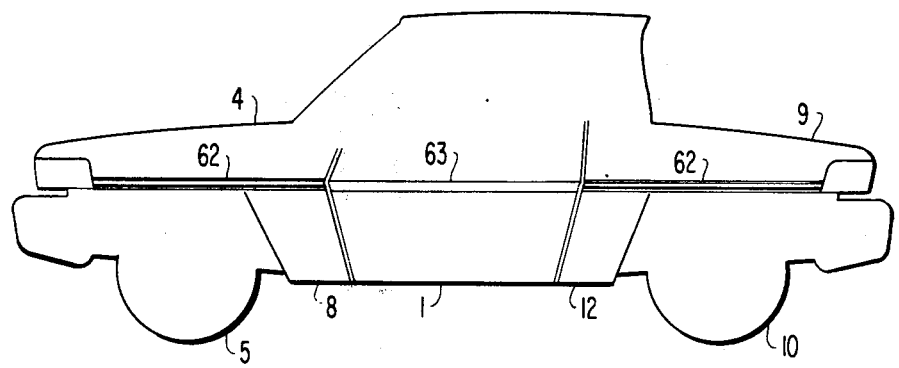

LATERAL COVERING FOR A PASSENGER MOTOR VEHICLE

This is a continuation, of application Ser. No. 560,819 filed Mar. 21, 1975.

The present invention relates to a lateral covering for a passenger motor vehicle which covers the framework within the area between the forward and/or rearward vehicle end and a lateral door opening or cutout.

Customarily, these covering body panel parts are constructed as fenders which extend in most cases in one piece from in front or from the rear up to the door opening and which together with a so-called wheel trough sheet metal member form a wheel casing for the front and rear wheels. These fenders are exposed particularly within the area adjacent the wheels to increased corrosion dangers. This is true in particular for the portion disposed between the front wheels and the door opening, against which road dirt or the like is thrown up by the wheels so that in addition to the wear and stresses conditioned on weather, mechanical stresses and loads additionally occur. It is additionally unfavorable with the one-piece fenders that already after slight accidents in which the damage is limited essentially to the forward area, the entire fender has to be exchanged which requires a high expenditure in repair and material consumption.

The present invention is now concerned with the task to provide a lateral body covering of the aforementioned type which compared to the known types of construction is characterized by a simplified manufacture, favorable stocking of parts, corrosion prevention, safety and repair facilitation. The present invention essentially consists in that the area between a wheel casing and the door cutout or opening is covered by an independently detachable body covering member which preferably consists of a non-metallic material.

By the use of a non-metallic material, preferably of a synthetic resinous material of conventional type, the corrosion-resistance of these endangered areas may be considerably increased. These covering parts may be readily manufactured, for example, as injection-molded parts and can be kept in stock in a particularly simple manner as they require only a relatively small amount of storage space. They also lead to considerable advantages during repairs since they can be exchanged in a simple and cost-saving manner. Additionally, the advantage results that these parts can be colored in any desired colors which can be constructed, for example, also differing from the remaining vehicle body as signal colors so that the lateral visibility of the vehicle is increased by these particularly emphasized body covering parts which improves the safety.

It is structurally particularly favorable if the independently detachable covering member extends from the bottom edge of the vehicle up to a plane extending approximately in the tire upper edge. This is the area which is particularly endangered by corrosion.

It is provided advantageously according to the present invention that the covering member is arranged at a distance to the framework arranged therebelow. It is assured thereby that a sufficient ventilation of the covered off framework parts is obtained so that a corrosion cannot be favored by condensation water or the like.

According to a further feature of the present invention, provision is made that the preferably horizontally extending separating line between the independent covering members and the remaining body covering is covered off by means of an elastic profile. This elastic profile which is constructed preferably as protection and/or wear strip, permits an unobstrusive transition between the different body cover panel members without making necessary expensive assembly and finishing operations.

Accordingly, it is an object of the present invention to provide a lateral covering for a passenger motor vehicle which avoids by simple means the aforementioned shortcomings and drawbacks encountered in the prior art.

Another object of the present invention resides in a lateral body cover structure for passenger motor vehicles which reduces the corrosion danger and at the same time decreases the repair costs in case of damage to the body within that area.

A further object of the present invention resides in a lateral body panel covering for passenger motor vehicles which excels by simplified manufacture, favorable stocking and increased safety.

Another object of the present invention resides in a lateral body cover panel structure for passenger motor vehicles which is simple to manufacture and assemble, yet offers a pleasing appearance to the observer.

These and further objects, features and advantages of the present invention will become more apparent from the following description when taken in connection with the accompanying drawing which shows, for purposes of illustration only, several embodiments in accordance with the present invention, and wherein:

FIGS. 3a through 3i are partial cross-sectional views taken along line III—III of FIG. 1 through various embodiments of a lateral body covering in accordance with the present invention; and FIG. 4 is a schematic side elevational view of a modified embodiment of a passenger motor vehicle equipped with a lateral body covering in accordance with the present invention.

Figure 1:
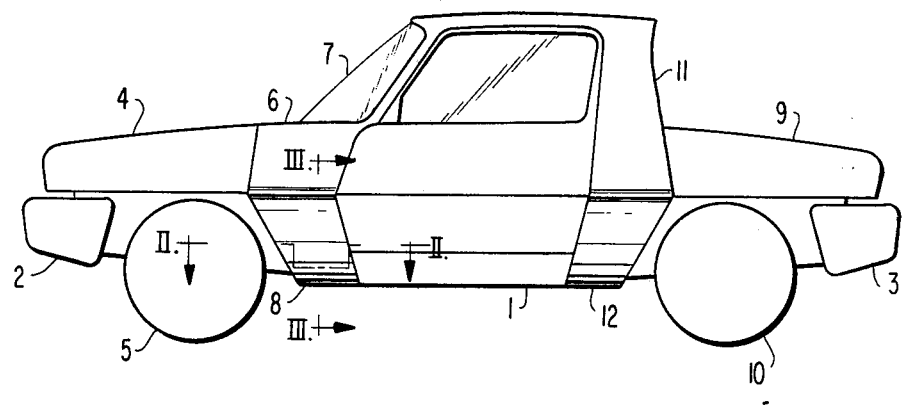
FIG. 1 is a schematic side elevational view of a passenger motor vehicle with a lateral body covering in accordance with the present invention.

Referring now to the drawing wherein like reference numerals are used throughout the various views to designate like parts, and more particularly to FIG. 1, this figure illustrates a two-seater passenger motor vehicle whose lateral body covering within the area between a side door closing off a door opening or cut-out consists both in front as also in the rear of several elements up to the end members constructed as bumpers 2 and 3. The lateral body covering of the forward vehicle end is formed by a fender 4 which includes a horizontally extending lower boundary edge that extends approximately in the plane of the upper edge of the tire of the front wheels 5. A further body covering member 6 adjoins this fender 4 which extends up to within the area of a windshield 7 and up to the door 1, i.e., up to the door cutout or opening associated therewith. The body covering member 6 extends downwardly only as far as the fender 4, i.e., approximately up to the plane of the tire upper edge. A further body covering member 8 adjoins the covering member 6 in the downward direction which occupies the area between the wheel casing and the door 1.

The lateral body covering of the rear area of the vehicle is constructed in a corresponding manner. Also, in this case, a fender 9 is provided which is delimited by a rectilinear bottom edge that lies approximately at the height of the tire upper edge of the rear wheels 10. A further body covering member 11 adjoins this fender 9 which may be connected with a roll-over girder and delimits the door cutout or opening. Also, this body covering member 11 extends downwardly only up to within the area of the tire upper edge and is continued therebelow by a further body covering member 12 which occupies the area between the wheel casing and the door cutout.

The body covering members 8 and 12 are located in places which are exposed to increased damage dangers and increased corrosion. They are therefore constructed as readily detachable separate structural parts and are made preferably of conventional synthetic plastic material such as synthetic resinous material. Whereas the other body covering members 4, 6, 9 and 11 are threadably connected or spot-welded to the vehicle, the cover members 8 and 12 are secured at the vehicle by readily detachable clip connections or the like. The construction and the fastening of the covering members 8 and 12 is far-reachingly identical so that it suffices if the further construction and the type of fastening will be explained hereinafter only by reference to the covering member 8. Provision is thereby made appropriately that the covering members 8 and 12 possess a symmetrical, mirror-image-like identical configuration so that a diagonal interchangeability is obtained which makes necessary only two different parts.

Figure 2A:
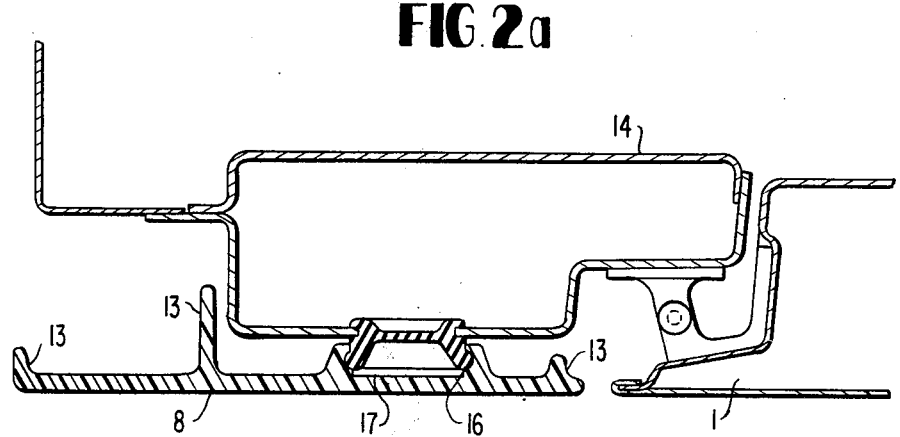
FIG. 2a is a cross-sectional view, on an enlarged scale, taken along line II—II of FIG. 1.

As can be seen from FIG. 2a, the covering member 8 is so arranged that it extends flush to the door 1 and to the remaining body covering parts in the vehicle contour. It is constructed as a plate-shaped synthetic plastic material part which is provided on its backside with reinforcing ribs 13. It is connected at least in two places with the vehicle framework, of which the forward door column 14 is visible in FIG. 2a which is constructed as a hollow bearer made from sheet-metal profiles. The body covering member 8 is arranged at a distance to the parts of the framework disposed therebelow and in particular to the door column 14 so that a free air circulation is obtained. For that purpose the parts of the framework and in particular the door column 14 are set back with respect to the outer contour of the vehicle. A rubber clip 15 is inserted by means of an annular groove into a bore of the outer wall of the door column 14, whose pot-shaped outwardly projecting portion engages with an annular bulge 16 into a corresponding undercut recess 17 of the covering member 8. The clip 15 is thereby so constructed that it securely fixes the covering member 8 at a predetermined distance to the door column 14.

Figure 2B:
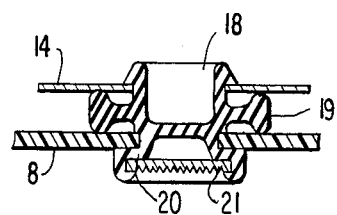
FIG. 2b is a partial cross-sectional view, similar to FIG. 2a, and illustrating a modified embodiment in accordance with the present invention.

FIG. 2b illustrates a similar fastening arrangement. In this embodiment, a rubber clip 18 is provided which is also engaged into an aperture of the door column 14. The rubber clip 18 is constructed in one piece with a spacer ring 19 which comes to lie between the door column 14 and the body covering member 8 and thus secures the mutual spacing. The rubber clip 18 includes a further shoulder 20 which is outwardly enlarged pot-shaped and which is engaged with an annular groove in a bore of the covering member 8. A reflector 21 is inserted into the same on the outside thereof which increases the lateral visibility of the vehicle.

As can be seen from FIG. 3a, the covering member 8 is secured with its upper horizontally extending edge at the covering member 6 disposed thereabove. The fastening thereby takes place appropriately in such a manner that the separating place between the two covering members 6 and 8 is covered off by an elastic profile 22 which is constructed as a protective or wear strip protecting the body against damage due to abrasion, scratching, wearing off, etc. In the embodiment according to FIG. 3a the upper edge of the covering member 8 is provided with a bulge-like thickened portion 23 which is equipped with an angularly shaped slot 24 open in the upward direction. The covering member 8 is mounted by means of this slot 24 on a corresponding angularly shaped flange 25 of the covering member 6. The emplacement takes place prior to the fastening of the lower portion of the covering member 8 with the aid of the rubber clip 15. The elastic profile 22 is so clamped in by means of a thickened portion 26 into a groove between the covering members 6 and 8 that it projects over the groove toward both sides and thereby covers off the separating joint. FIG. 3b illustrates a similar construction in which in lieu of a groove between the covering members 6 and 8, a groove 27 is machined into the edge of the covering member 8 which receives the bulge-shaped thickened portion 26 of the elastic profile 22. The groove 27 is so positioned that the elastic profile projects with a sealing lip-like rim so far over the covering member 8 that it abuts at the covering member 6 and covers off the separating joint.

In the embodiment according to FIG. 3c, the separating place between the covering members 6 and 8 is also covered off by an elastic profile 28 which is constructed as protective and wear strip. With this type of construction, the fastening of the covering member 8 takes place simultaneously with the fastening of the elastic profile 28 which is equipped with spring clips 29 which extend through bores of the upper edge of the covering member 8 and engage in bores of a flange 30. The flange 30 forms a groove-like recess on the outside, into which the correspondingly thickened and offset upper edge of the covering member 8 is inserted so that an additional securing of the covering member 8 in the vertical direction is obtained.

In the embodiment according to FIG. 3d, an elastic profile 31 serving as protection and wear strip is mounted with a corresponding recess or aperture on a T-shaped web 32 of the upper thickened edge of the covering member 8. The elastic profile 31 is provided with a longitudinal groove, by means of which it is mounted on a flange 33 of the upper covering member 6. Additionally, the edge of the covering member 8 is provided with a shoulder 34, by means of which it is held in a vertical direction at a further flange 35 and is centered thereby. An additional elastic profile 36 is thereby provided between the shoulder 34 and the flange 35. The elastic profile 31 includes a hexagonal aperture or recess open in the outward direction and extending in its longitudinal direction, into which a lighting rod 37 is so inserted that one of its surfaces extends parallel to the outer edge of the profile 31. The lighting rod 37 is illuminated at one or both of its ends by an electric lamp in a conventional manner not illustrated in detail so that the outwardly disposed surface becomes visible as lighting strip, by means of which the possibility of seeing the vehicle from the side is considerably improved. This may be of considerable importance in accidents during which a vehicle is positioned transversely to the road so that its headlights or backlights cannot be seen.

In the embodiment according to FIG. 3e, an elastic profile 39 serving as protection and wear strip is secured at the upper covering member 6 which is provided with a longitudinal groove 38. The fastening takes place with the aid of spring clips 40 which are supported with their head at a rail 41 disposed on the inside of a hollow space of the elastic profile 39, whose cross section is matched to the cross section of the groove 38. The hollow space of the elastic profile 39 is accessible from below by way of a slot, through which the thickened edge of the lower covering member 8 is inserted, which is retained form-lockingly in the profile 39. The profile 39 is equipped on its outside either continuously or at several places with reflectors 42.

In the embodiment according to FIG. 3f, an elastic profile 43 serving a protection and wear strip is provided which connects the two covering members 6 and 8 clamp-like. The covering member 6 is provided with a slightly obliquely upwardly and outwardly projecting flange 44, on which is mounted the correspondingly recessed, thickened upper edge of the covering member 8. Before the edge is mounted with the corresponding groove, a projection 45 of the elastic profile provided with a longitudinal groove is inserted into the same which effects an elastic stress between the flange 44 and the aperture or recess of the edge of the covering member 8. The profile 43, as to the rest, is form-lockingly secured at the profiled edge of the covering member 8. It is provided externally with a longitudinal groove open toward the outside and approximately cylindrical in cross section, into which a cylindrical lighting rod 46 is inserted which may also be connected at one or both of its ends to a light source.

The embodiment according to FIG. 3g corresponds essentially to the embodiment according to FIG. 3d. In this case, the elastic profile 48 is inserted with a dovetail-shaped extension 49 into a corresponding aperture of the profiled upper edge of the covering member 8.

In the embodiments according to FIGS. 3h and 3i, the profiled upper edge of the covering member 8 is held at the upper covering member 6 in a similar manner as in the embodiments according to FIGS. 3d and 3g. The covering member 8 engages with a shoulder 50 behind a web of the covering member 6 and is supported with a shoulder 51 offset to the first shoulder 50 by 90°, at an angle profile 52. The edge of the covering member 8 is enclosed or surrounded with an elastic profile 53 which abuts at the fastening places. An elastic profile 54 serving as protection and wear strip is clipped onto the outside of the profiled edge of the covering member 8, which is fastened in a clip-like manner with an extension 55 engaging into a slot 56 that is enlarged in the inward direction. A reflector 57 is inserted externally into the elastic profile 54.

In the embodiment according to FIG. 3i, the edge is provided with a dovetail-shaped longitudinal groove 58, into which a correspondingly profiled extension 59 of an elastic profile 60 is inserted. The elastic profile 60 receives a lighting rod 61 connected to a light source which is visible from the outside.

It can readily be seen from FIG. 4 that the elastic profiles 62 corresponding to the embodiments according to FIGS. 3a to 3i which cover the separating joint between the lower covering members 8 or 12 and the covering members 6 or 11 disposed thereabove, are extended appropriately up to the vehicle ends. A corresponding profile 63 serving as protection and wear strip is then appropriately mounted at the same height also at the door 1.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A lateral body covering structure for a vehicle having a frame, front and rear vehicle wheel casings, and at least one vehicle door opening located between said vehicle wheel casings, said covering structure comprising body covering means for covering the vehicle frame at lateral portions of the vehicle, wherein said body covering means includes separate independently detachable cover members extending only between the front and rear vehicle wheel casings and the respective intermediate vehicle door openings for covering the vehicle frame thereat, wherein each of said separate independently detachable cover members consits of a non-metallic panel member, wherein each of said panel members extends horizontally between the adjacent wheel casing and the adjacent door opening and extends vertically between the bottom edge of the vehicle and a plane extending horizontally approximately at the upper edge of the vehicle wheel casing, wherein a separating gap is formed between said independently detachable non-metallic cover members and an adjacent portion of said body covering means, said separating gap being covered by an elastic profile means, and wherein said independently detachable non-metallic cover members are fixedly secured in proximity of a lower edge to the vehicle frame at a predetermined separation distance therefrom by means of an elastic clip element.

2. A covering structure according to claim 1, wherein said body covering means further includes body panels extending over the remaining lateral portions of the vehicle other than the area having said non-metallic panel member, and wherein said body panels and said non-metallic panel member are substantially in the same plane.

3. A covering structure according to claim 1, wherein said non-metallic panel member is detachably connected to at least one frame member of the vehicle frame.

4. A covering structure according to claim 3, wherein said non-metallic panel member is detachably connected to an adjacent one of said body panels.

5. A covering structure according to claim 3, wherein said non-metallic panel member is separated from an adjacent one of said body panels along a horizontally extending gap.

6. A covering structure according to claim 5, wherein said horizontally extending gap is covered by a profiled member.

7. A covering structure according to claim 6, wherein said profiled member serves to detachably connect said non-metallic panel member with said adjacent body panel.

8. A covering structure according to claim 1, wherein said body covering means covers the lateral vehicle portions between the forward vehicle end as well as between the rear vehicle end and the respective lateral door openings.

9. A covering structure according to claim 8, wherein said independently detachable non-metallic cover members have reinforcing ribs on their backsides.

10. A covering structure according to claim 1, wherein said separating gap extends approximately horizontally.

11. A covering structure according to claim 10, wherein said elastic profile means are clamped into said separating gap between said independently detachable non-metallic cover members and the adjacent portions of said body covering means.

12. A covering structure according to claim 10, wherein said elastic profile means are clipped into said independently detachable non-metallic cover members, and project over an edge thereof.

13. A covering structure according to claim 10, wherein said independently detachable non-metallic cover members are additionally secured by means of said elastic profile means.

14. A covering structure according to claim 10, wherein common fastening means are provided for said elastic profile means and said independent non-metallic cover members.

15. A covering structure according to claim 14, wherein said common fastening means are constructed as clips.

16. A covering structure according to claim 10, wherein said elastic profile means receive lighting rod means.

17. A covering structure according to claim 10, wherein said elastic profile means receive reflector means.

18. A covering structure according to claim 10, wherein said elastic profile means extend from the vehicle end up to the door opening.

19. A covering structure according to claim 1, wherein said independently detachable non-metallic cover members have reinforcing ribs on their backsides.

20. A covering structure according to claim 1, wherein said elastic profile means are clamped into said gap between said independently detachable non-metallic cover members and the adjacent portion of said body covering means.

21. A covering structure according to claim 1, wherein said elastic profile means are clipped into said independently detachable non-metallic cover members and project over the edge thereof.

22. A covering structure according to claim 1, wherein said independently detachable non-metallic cover members are additionally secured by means of said elastic profile means.

23. A covering structure according to claim 1, wherein common fastening means are provided for said elastic profile means and said independently detachable non-metallic cover members.

24. A covering structure according to claim 23, wherein said common fastening means are constructed as clips.

25. A lateral body covering structure for a vehicle having a frame, front and rear vehicle wheel casings, and at least one vehicle door opening located between said vehicle wheel casings, said covering structure comprising body covering means for covering the vehicle frame at lateral portions of the vehicle, wherein said body covering means includes separate independently detachable cover members extending only between the front and rear vehicle wheel casings and the respective intermediate vehicle door openings for covering the vehicle frame thereat, wherein each of said separate independently detachable cover members consists of a non-metallic panel member, said non-metallic panel member being detachably connected to at least one frame member of the vehicle frame with a separating space between said panel member and the vehicle frame, said separating space being predetermined by an elastic clip element, and wherein said non-metallic panel member is also separated from an adjacent one of said body panels along a horizontally extending gap, said horizontally extending gap being covered by a profiled member.

26. A covering structure according to claim 25, wherein said profiled member receives lighting rod means.

27. A covering structure according to claim 25, wherein said profiled member receives reflector means.

28. A covering structure according to claim 25, wherein said profiled member extends from the vehicle end up to the door opening.

29. A covering structure according to claim 25, wherein said profiled member serves to detachably connect said non-metallic panel member with said adjacent body panel.

30. A covering structure according to claim 29, wherein said profile member is clamped into said horizontally extending gap.

31. A covering structure according to claim 29, wherein said profile member is clipped into said independently detachable non-metallic cover members, and project over an edge thereof.

32. A covering structure according to claim 29, wherein common fastening means are provided for said profile member and said independent non-metallic cover members.

33. A covering structure according to claim 32, wherein said common fastening means are constructed as clips.

* * * * *